United States Patent [19]
Stampfli

[11] 3,827,672
[45] Aug. 6, 1974

[54] ELECTROMAGNETICALLY CONTROLLED FLUID-OPERATING VALVE

[75] Inventor: Harald Stampfli, Petit-Saconnex, Switzerland

[73] Assignee: Lucifer S.A., Carouge-Geneva, Switzerland

[22] Filed: Dec. 13, 1972

[21] Appl. No.: 314,598

[30] Foreign Application Priority Data
Dec. 29, 1971 Switzerland........................ 19108/71

[52] U.S. Cl.............. 251/129, 137/625.65, 251/77, 251/139
[51] Int. Cl............................................. F16k 31/06
[58] Field of Search..................... 251/129, 139, 77; 137/625.65, 596.16, 596.17, 625.64

[56] References Cited
UNITED STATES PATENTS
2,735,644   2/1956   Bishofberger................... 251/129 X
2,819,432   1/1958   Ray................................. 251/129 X Primary Examiner—Arnold Rosenthal
Attorney, Agent, or Firm—Emory L. Groff; Emory L. Groff, Jr.

[57] ABSTRACT

An electromagnetically controlled valve wherein the sealing member is subjected to a reduced straining through the fact that the usual valve-closing spring is inserted between a stationary transverse supporting member and a sealing member floatingly carried inside a recess provided in an electromagnetically controlled core. Thus the spring acts, upon deenergization of the controlling coil, on the sealing member to urge it against a flange surrounding the opening of the recess, an idle motion being afforded for the core beyond the point corresponding to engagement between the sealing member and its seat to allow the core to continue its return movement to a slight extent without interference of the spring.

5 Claims, 2 Drawing Figures

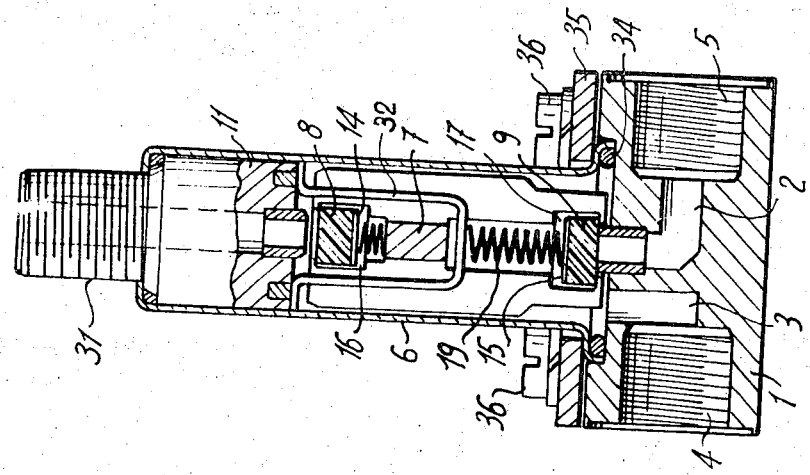
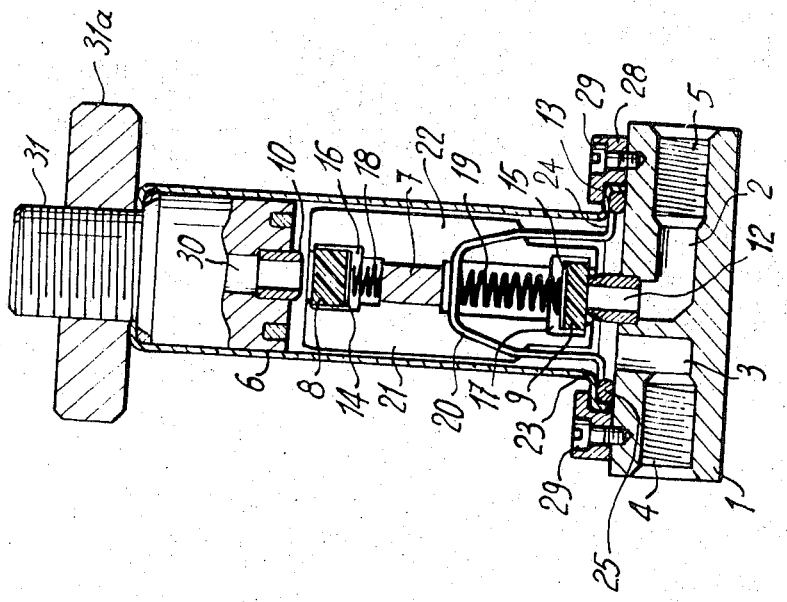

ELECTROMAGNETICALLY CONTROLLED FLUID-OPERATING VALVE

Electromagnetically controlled fluid-operating valves are already known, which include a movable ferromagnetic core sliding inside a cylinder of non-magnetic material which is closed at one end by a ferromagnetic member, said core being adapted to be moved against the action of a spring by a magnetic field produced by an electrically energized coil and being provided with at least one longitudinal groove and with a sealing member cooperating with the seat of the valve, and a spring acting on said core to hold it in position.

The object of the present invention is to provide means for constructing such a valve in a simple manner and making it less bulky as to height.

To this end, the valve according to the invention includes a supporting member extending through the groove into engagement with the end of the spring facing away from the sealing member, said supporting member being longitudinally stationary inside the cylinder, so as to form a bearing for said end of the spring.

The accompanying drawing illustrates, diagrammatically and by way of example, two embodiments of the improved valve according to the invention. In said drawing:

FIG. 1 is an axial cross-section of the first embodiment.

FIG. 2 is a similar cross-section of the second embodiment.

Turning to FIG. 1, the three-way valve illustrated includes a body 1 provided with a channel 2 feeding fluid under pressure and with a channel 3 connected with a fluid-controlled apparatus such as a hydraulic jack. These channels are both provided with terminal tappings, 4 and 5 respectively, through which the valve may be connected with fluid-conveying pipes.

The body 1 carries a cylinder or tube 6 of non-magnetic material enclosing a movable core 7 of ferromagnetic material. Said core 7 is adapted to slide axially inside the tube 6 and carries floatingly two sealing members, respectively a sealing member 8 for cooperation with a seat 10 formed on a member 11 of ferromagnetic material closing the upper end of the tube 6, and a sealing member 9 cooperating with a seat 12 formed on the body 1.

Each of the sealing members 8 and 9 is a disc made of an elastomer capped by a metal washer, respectively 14 and 15. Each sealing member is furthermore enclosed inside a recess formed in the core 7 and shown respectively at 16 and 17, the outer end of which is restricted, so as to prevent the sealing member from escaping out of its recess. The sealing member 8 is subjected to the pressure of the spring 18 bearing against the core 7 whereas the sealing member 9 is urged against its seat 12 by a spring 19 bearing against a transverse stirrup-shaped supporting member 20.

The core 7 is provided with two longitudinal diametrically opposed grooves 21 and 22, the depth of which, starting from the outer surface of the core, is sufficient for them to communicate with the recesses 16 and 17. These grooves thus form with the recess 17 a housing for the stirrup-shaped member 20.

The ends 23 and 24 of the member 20 are bent and fitted underneath the outer terminal flange 13 of the tube 6. Said tube 6 is secured, together with the parts carried by it, to the body 1, with the interposition of a tore-shaped packing 25 by means of a collar 28 screwed tight over the body 1 by the screws 29. The member 11 closing the upper end of the tube 6 is provided with a channel 30 connected with an exhaust and with a threaded end 31 adapted to be engaged by a nut 31a securing an electric coil in position. The core of the coil, which is not illustrated, is carried by the tube 6 and its energization produces a shifting of the valve core 7 by reason of the magnetic attraction of the core 7 by the magnetic member 11.

In the position illustrated, the seat 12 is closed by the sealing member 9 so that the output channel is connected with the exhaust channel through the grooves 21 and 22 of the core 7 inside the tube 6.

When the electromagnetic coil is energized, the core 7 is drawn towards the closing member 11 so that the seat 10 is now closed by the sealing member 8 while the seat 12 is set free by the rise of the sealing member 9. This upward movement of the core 7 is carried out against the opposing thrust exerted by the spring 19 which is compressed between the rising sealing member 9 and the stirrup-shaped member 20.

When the energization of the electromagnetic coil is switched off, the spring 19 urges the core 7 back into the position illustrated. Since the spring 19 acts on the core 7 through the sealing member 9 and makes it engage the flange defining the outer end of the recess 17, the action of the spring on said flange of the core ceases as sson as the sealing member has actually engaged the cooperating seat 12. Consequently, the sealing member which no longer has to damp the kinetic energy of the core is subjected to a lesser straining.

It should be noted that the spring 19 performs two functions, to wit: firstly, it urges the core 7 back into its inoperative starting position illustrated in FIG. 1 as soon as the magnetic field produced by the coil, which is not illstrated, has disappeared, and secondly it holds the sealing member 9 fast in its closed position against the fluid pressure in the input channel 2.

The second embodiment of the invention illustrated in FIG. 2 is very similar to that described with reference to FIG. 1 and the similar parts in both figures are identified by the same reference numbers.

In this embodiment, the stirrup-shaped member is replaced by a U-shaped member 32 the two legs of which bear against the lower surface of the closing member 11. Said U-shaped member 32 forms a bearing for the upper end of the spring 19, the opposite end of which engages the sealing member 9.

The tube is rigidly secured to the body 1, with the interposition of the tore-shaped packing 34, by a small plate 35 and screws 36.

In this second embodiment, the U-shaped member 32 need not be secured to a stationary part of the valve since the pressure of the spring 19 is sufficient for it to be held permanently in contact with the closing member 11.

I claim:

1. An electromagnetically controlled fluid-operating valve of the type including a movable ferromagnetic core sliding inside a cylinder of non-magnetic material closed at one end by a ferromagnetic member, said core being adapted to be moved against the action of a spring by a magnetic field produced by an electrically energized coil and being provided with at least one external longitudinal groove and with a sealing member cooperating with the seat of the valve, a spring acting on said core to hold it in position, said core having an axial recess receiving said spring, said valve being characterized by a supporting member extending through said groove into engagement with the end of the spring facing away from the sealing member, said supporting member being longitudinally stationary inside the cylinder, so as to form a bearing for said end of the spring.

2. A valve as claimed in claim 1, wherein said recess opens into one of the ends of the core, said sealing member being floatingly located in said recess at the opened side thereof and providing a bearing surface for the end of the spring opposite the end cooperating with said supporting member.

3. A valve as claimed in claim 2, wherein the sealing member is held in said recess in the core by an inner flange adjacent the opening of said recess, said spring acting on said core with the interposition of the sealing member and of said flange until the sealing member engages its seat and allows the flange to continue moving to a slight extent without interference of the spring.

4. A valve as claimed in claim 3, wherein the supporting member extends transversely with reference to the core across the recess in the core and into the diametrically opposed grooves in the latter.

5. A valve as claimed in claim 4, wherein the supporting member is stirrup-shaped, the medial transverse portion of the stirrup being housed inside the recess so as to form a bearing for the spring.

* * * * *